United States Patent [19]
Tauvron et al.

[11] Patent Number: 5,769,721
[45] Date of Patent: Jun. 23, 1998

[54] TORSION DAMPER WITH A CONTROL RING, IN PARTICULAR A MOTOR VEHICLE FRICTION CLUTCH

[75] Inventors: Fabrice Tauvron, Creteil; Sylvain Thomire, Levallois, both of France

[73] Assignee: Valeo, Paris, France

[21] Appl. No.: 643,100

[22] Filed: May 2, 1996

[30] Foreign Application Priority Data

May 2, 1995 [FR] France .................................. 95 05461

[51] Int. Cl.⁶ ...................................................... F16D 3/14
[52] U.S. Cl. ........................ 464/63; 192/213.12; 464/68
[58] Field of Search ................................. 464/64, 65, 66, 464/68; 192/213.1, 205, 213.11, 213.12; 74/574

[56] References Cited

U.S. PATENT DOCUMENTS

| | | | |
|---|---|---|---|
| 4,000,794 | 1/1977 | Worner ................................. | 192/213.3 |
| 4,700,822 | 10/1987 | Maucher et al. ..................... | 464/68 X |
| 4,789,053 | 12/1988 | Fischer et al. ........................ | 464/68 X |
| 4,890,712 | 1/1990 | Maucher et al. ..................... | 464/68 X |
| 4,895,237 | 1/1990 | Maucher .............................. | 464/63 X |
| 4,969,855 | 11/1990 | Graton et al. ........................ | 464/64 X |
| 4,998,608 | 3/1991 | Raab et al. .......................... | 192/213.12 |
| 5,016,744 | 5/1991 | Fischer et al. ................. | 192/213.12 X |
| 5,209,334 | 5/1993 | Fisher et al. ........................... | 464/68 X |
| 5,240,458 | 8/1993 | Linglain et al. ............... | 192/213.12 X |

FOREIGN PATENT DOCUMENTS

| | | |
|---|---|---|
| 2613800 | 10/1988 | France . |
| 2706962 | 12/1994 | France . |
| 4304778 | 8/1993 | Germany . |
| 4417660 | 12/1994 | Germany . |
| 4419424 | 1/1995 | Germany . |
| 2167527 | 5/1986 | United Kingdom . |
| 2234322 | 1/1991 | United Kingdom . |
| 2247299 | 2/1992 | United Kingdom . |
| 2254398 | 10/1992 | United Kingdom . |

*Primary Examiner*—Eileen A. Dunn
*Attorney, Agent, or Firm*—Longacre & White

[57] ABSTRACT

A torsion damper includes a predamper having an input part which is coupled in rotation to the damper plate of a main damper, together with an output part which is coupled in rotation to an output element of the main damper. A control ring is interposed axially between the input part of the predamper and the main damper plate. The control ring has an abutment for cooperation with at least one of the lateral edges of a first window (12) formed in one of the guide rings of the main damper.

16 Claims, 8 Drawing Sheets

TORSION DAMPER WITH A CONTROL RING, IN PARTICULAR A MOTOR VEHICLE FRICTION CLUTCH

FIELD OF THE INVENTION

The present invention relates to torsion dampers, especially those constituting friction clutches, or clutch friction wheels, for motor vehicles.

More particularly, the invention is related to a torsion damper of this kind which comprises: an input element such as a support disc, fixed to two guide rings which are mounted on either side of a damper plate, and which are connected and fastened to each other by means of spacers; first housings formed in facing relationship with each other in the guide rings and the damper plate respectively; first circumferentially acting resilient members mounted in the said housings so as to couple the guide rings resiliently to the damper plate; an output element such as a hub, surrounded by the guide rings and the damper plate; loose coupling means interposed operatively between the inner periphery of the damper plate and the outer periphery of the output element, for coupling the damper plate with the output element for rotation together after a circumferential clearance, defined by the loose coupling means, has been taken up; a torsion predamping device, also referred to as a predamper, which is mounted, firstly, radially inwardly of the first resilient members, and secondly, axially between the damper plate and one of the guide rings, referred to as the first guide ring; and axially acting friction means comprising at least one friction ring and an axially acting resilient ring bearing on the other guide ring, referred to as the second guide ring, so as to act on the friction ring and clamp the predamper between the damper plate and the first guide ring.

BACKGROUND OF THE INVENTION

A torsion damper of the above kind is described in the specification of French patent application 2,714,436 filed on 4 Nov. 1993. In that specification, the predamper comprises, for coupling it in rotation with the damper plate, axial projecting elements which are engaged in associated drive apertures formed in the damper plate. In that type of damper, it is of advantage, in order to produce additional friction forces, to provide a control ring with at least one radially projecting abutment means which is adapted to come into engagement on at least one of the circumferential ends of one of the first resilient members.

In the light of French patent specification FR 2,706,962 A, it can be conceived that the control ring may be interleaved between the predamper and the first guide ring, with the said control ring being adapted to cooperate with at least one of the edges of the corresponding said first housing in the damper plate. However, such an arrangement is not entirely satisfactory, because it gives rise to additional stresses in the damper plate, which has already been weakened by the provision of the above mentioned drive apertures.

In addition, the control ring necessarily has a serpentine shape, so that it can extend radially inwardly of the predamper and come into axial engagement with the damper plate.

DISCUSSION OF THE INVENTION

An object of the present invention is to overcome these drawbacks, and thereby to provide, in a simple and inexpensive way, a simplified torsion damper having a control ring and having a less weakened damper plate.

According to the invention, a torsion damper, especially a friction clutch for a motor vehicle, comprising: an input element such as a support disc, fixed to two guide rings which are mounted on either side of a damper plate, and which are connected and fastened to each other by means of spacers; first housings formed in facing relationship with each other in the guide rings and the damper plate respectively; first circumferentially acting resilient members mounted in the said housings so as to couple the guide rings resiliently to the damper plate; an output element such as a hub, surrounded by the guide rings and the damper plate; loose coupling means interposed operatively between the inner periphery of the damper plate and the outer periphery of the output element, for coupling the damper plate with the output element for rotation together after a circumferential clearance, defined by the loose coupling means, has been taken up; a torsion predamping device, also referred to as a predamper, which is mounted, firstly, radially inwardly of the first resilient members, and secondly, axially between the damper plate and one of the guide rings, referred to as the first guide ring; and axially acting friction means comprising at least one friction ring and an axially acting resilient ring bearing on the other guide ring, referred to as the second guide ring, so as to act on the friction ring and clamp the predamper between the damper plate and the first guide ring, wherein the predamper comprises an input part coupled in rotation to the damper plate, an output part coupled in rotation to the output element, and circumferentially acting second resilient members interposed between the input part and the output part, and wherein a control ring, having an abutment means projecting radially so as to come into engagement with one of the circumferential ends of one of the first resilient members, is acted on by the said friction means, being arranged between the damper plate and the first guide ring, is characterised in that the control ring is interposed axially between the input part of the predamper and the damper plate, and in that the abutment means of the control ring is adapted to cooperate with at least one of the lateral edges of the first housing in the first guide ring, associated with the first resilient members and adapted to cooperate with the said abutment means.

Thanks to the invention, the control ring has a simple and strong form, because it is fitted axially between the damper plate and the input part of the predamper. This control ring can thus be made of a synthetic material such as a fibre reinforced plastics material.

In addition, the damper plate is strengthened, because the abutment means is arranged to cooperate with one of the circumferential ends of the appropriate first housing in the first guide ring, which is thus not weakened unduly because use is made of the housing (or window) that already exists.

Thus the control ring can be made flat, except at the level of its abutment means, which projects both axially and radially with respect to the flat part of the control ring.

The abutment means may be in the form of a fork cooperating with each of the circumferential ends of the first resilient member (or spring) associated with it.

However, in particular so as to provide a differential friction effect, according to a preferred feature of the invention the said abutment means is adapted to cooperate, firstly, with one of the circumferential ends of the associated first resilient member and the appropriate edge of the associated housing in the first guide ring, and secondly, with axially projecting elements which are fixed to the output element of the predamper.

Thus, following the direction of rotation of the first guide ring with respect to the damper plate, friction is able to be set up between the damper plate and the control ring, and between the control ring and the input part of the predamper. In the opposite direction of rotation, the control ring, urged by the appropriate first resilient member or spring, is immobilised, so that no friction takes place between it and the assembly consisting of the damper plate and the input part of the torsion predamper.

The control ring may be of metal, as may be the damper plate, while the input part of the predamper may be made in a suitable synthetic material, for example one having a low coefficient of friction. As a result, in the direction of rotation of the first guide ring with respect to the damper plate, not only is metal to metal friction obtained, but also friction between metal and a synthetic material. This leads to improved absorption of the vibrations.

In a modified version, the input part may also be of metal, so as to enable two surfaces to be obtained for metal to metal frictional contact between them.

These frictional effects can be obtained by coating either one or both faces of the control ring with a material having a predetermined coefficient of friction.

In one embodiment of the invention, the axially projecting elements of the input part of the predamper are themselves constituted by the drive projections for driving cooperation between the input part and the damper plate.

In a modified version, the axially projecting elements of the input part of the predamper are different from these drive projections.

The predamper preferably itself comprises two further guide rings which are arranged on either side of a second damper plate. In that case, the drive projections may consist for example of axial lugs of one predamper guide ring which lies further away from the damper plate of the predamper than does the other guide ring of the latter, with these axial lugs penetrating into associated apertures formed in the first damper plate.

In a modified version, the said projecting elements may consist of axial lugs of the said guide ring which do not penetrate into the first (or main) damper plate. In a further modification these projecting elements may be formed on that guide ring of the predamper which is located adjacent to the control ring.

In yet another modification, the predamper includes an input part which includes a bearing for centring the first guide ring of the torsion damper. In that case, the said projecting elements are carried by this bearing itself, and provide centring for the main damper plate.

Further features and advantages of the invention will appear more clearly on a reading of the following detailed description of preferred embodiments of the invention, which is given by way of non-limiting example only and with reference to the accompanying drawings.

DESCRIPTION OF PREFERRED EMBODIMENTS OF THE INVENTION

Figure 1:
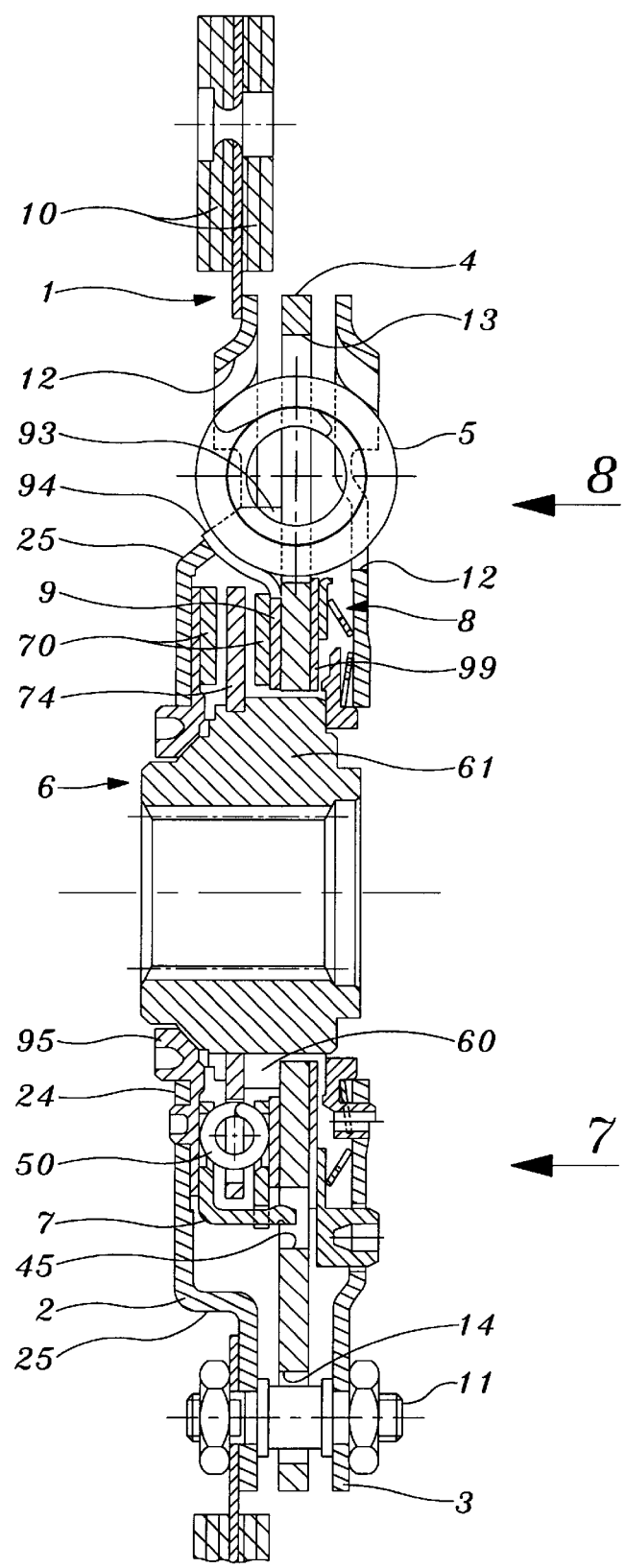
FIG. 1 is a view in axial cross section of a torsion damper in accordance with the invention, consisting of a friction clutch for a motor vehicle.

In the drawings, the torsion damper comprises an input element 1 which is adapted to be mounted on a driving shaft for rotation with the latter, together with an output element 6 which is adapted to be mounted on a driven shaft for rotation with the driven shaft.

In the present case, the torsion damper consists of a friction clutch for a motor vehicle, and the input element 1 consists of a support disc 1 which carries, secured on each of its faces, friction liners 10. In the manner known per se, the friction liners 10 are arranged to be gripped between the pressure plate and the reaction plate of the clutch (neither of which is shown in the drawings), while the output element 6 consists of a hub 61 which is splined internally for coupling it in rotation with the input shaft of the gearbox (not shown). The support disc 1 is mounted on the crankshaft (not shown) of the internal combustion engine of the vehicle, for rotation with the crankshaft when the friction liners 10 are gripped between the pressure and reaction plates of the clutch.

The support disc 1 is fixed to two guide rings 2 and 3, which are mounted on either side of a damper plate 4 and which are fastened together by means of spacers 11. In this example, these spacers 11 extend, with a circumferential clearance, through slots 14 and 114 (see FIG. 3) which are formed in the damper plate 4 close to its outer periphery. The guide rings 2 and 3, and the damper plate 4, are oriented transversely, and surround the hub 6.

Figure 3:
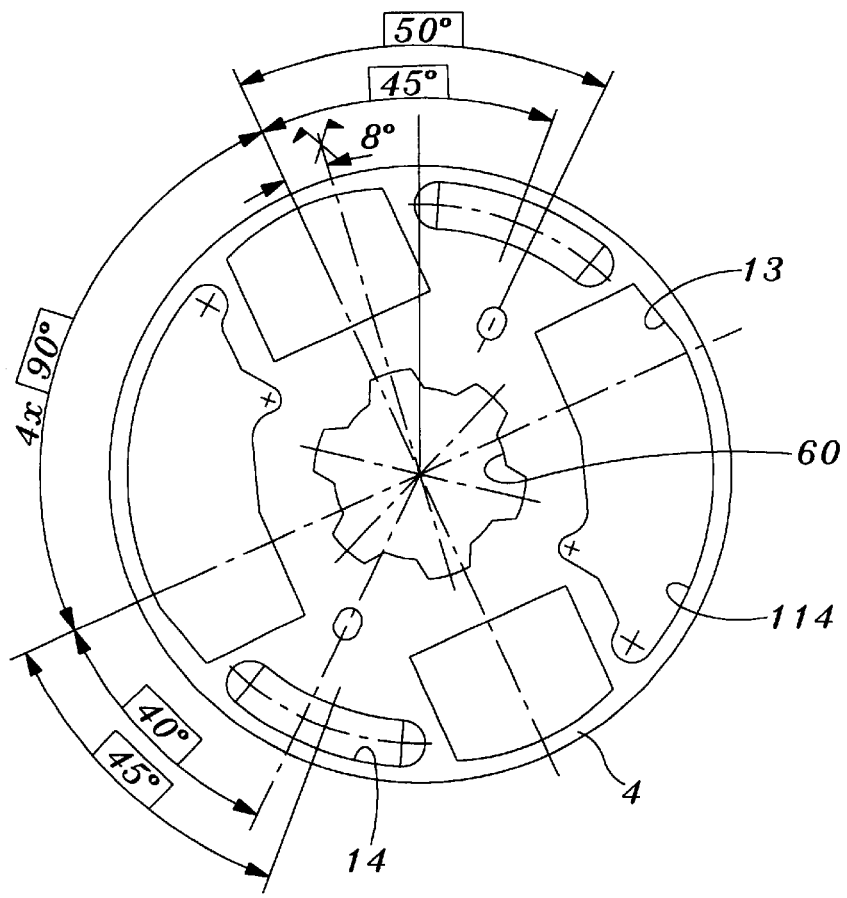
FIG. 3 is a front view on a reduced scale, showing the damper plate of torsion damper of FIG. 1.
Figure 4:
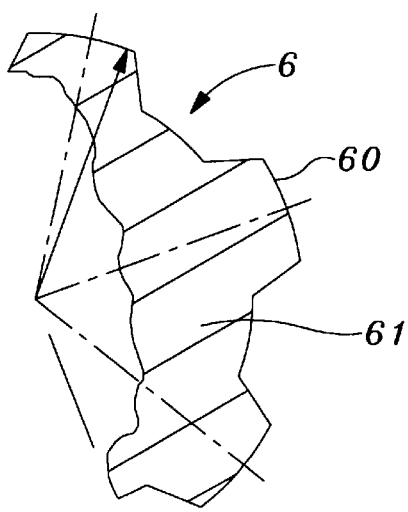
FIG. 4 is a partial view on an enlarged scale, showing the tooth set of the hub in FIG. 1.

The guide rings 2 and 3, disposed axially on either side of the damper plate 4, are mounted on the hub 6 for rotation with respect to the latter. Loose coupling means 60 are interposed between the inner periphery of the damper plate 4 and the outer periphery of the hub 6, so as to couple the damper plate 4 with the hub 6 for relative rotation between these latter components after a circumferential clearance, defined by the loose coupling means, has been taken up. In this example, these loose coupling means 60 consist, in a manner known per se, of a set of teeth formed on the inner periphery of the damper plate as is best seen in FIG. 3, together with a corresponding tooth set formed at the outer periphery of the hub 6, as shown in FIG. 4. Each of these tooth sets comprises trapezoidal teeth arranged alternately with notches.

The teeth of the hub 6 penetrate, with the above mentioned circumferential clearance, into the notches in the tooth set of the damper plate 4, and vice versa. The limitation of the angular displacement of the damper plate 4 with respect to the hub 6 is thus obtained by the teeth of the damper plate 4 coming into engagement with those of the hub 6. In the present case the tooth set of the hub 6 is formed in a flange 61 of the hub 6. The flange 61 projects radially from the outer periphery of the hub.

Figure 5:
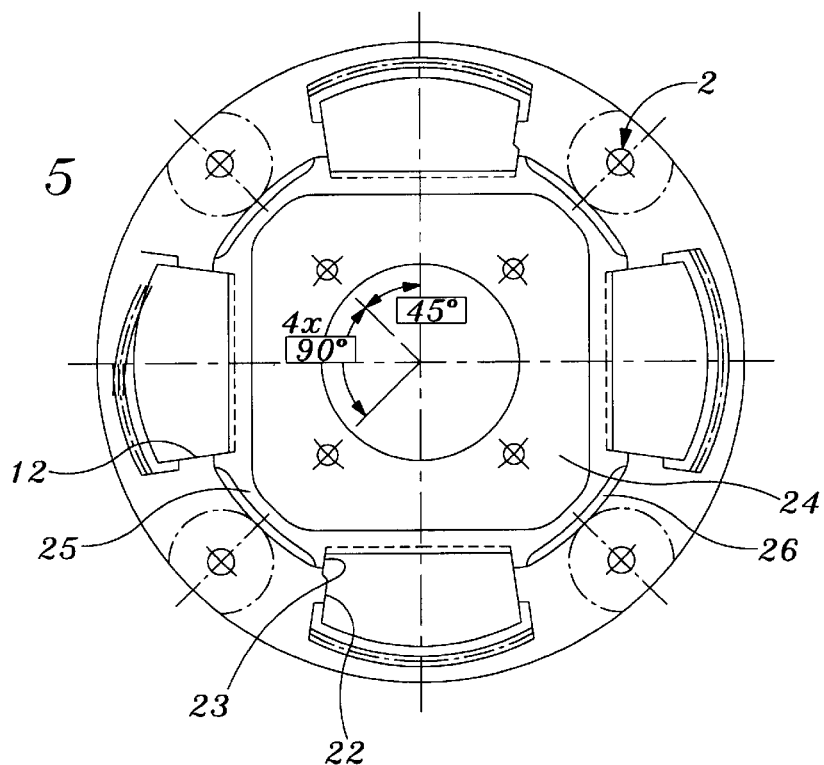
FIG. 5 is a front view, on a reduced scale, of the first guide ring of FIG. 1.
Figure 6:
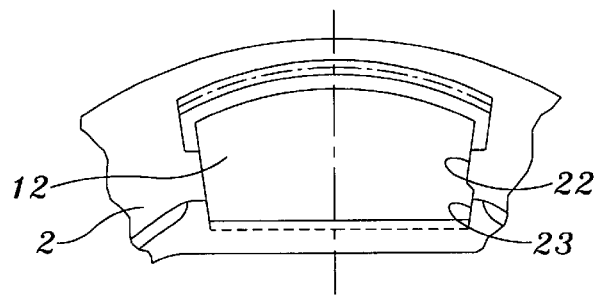
FIG. 6 is a view on an enlarged scale of one of the housings or windows in the first guide ring shown in FIG. 5, this housing being associated with the abutment means of the control ring in accordance with the invention.

The guide rings 2 and 3, and the damper plate 4, have respective housings 12 and 13 arranged in facing relationship with each other, and first circumferentially acting resilient means 5 are mounted in these housings. In the present case the housings 12 and 13, which are shown most clearly in FIGS. 3 and 5, consist of windows, while the resilient members 5 are coil springs. The coil springs 5 are mounted in pairs, without any circumferential clearance, in the windows 12 of the guide rings 2 and 3, and are also mounted in the windows 13 of the damper plate. The number of these pairs of springs 5 does of course depend on the particular application; but in this example, there are four pairs of these springs 5, spaced apart at regular intervals on a common pitch circle. The mounting of two of these pairs in windows 13 of the damper plate 4 is made with a circumferential clearance, while that of the other two pairs in the windows 13 is without any clearance. This gives a two-stage operation of the damper springs 5.

In this example, the spacers 11 are in the form of double ended bolts with a spacing shank and two terminal threaded portions. The slots 14 through which some of the spacers 11 pass consist of two diametrically opposed oblong apertures, while there are two of the other slots 114 for spacers 11, again diametrically opposed to each other and constituting extensions of two of the windows 13 of the damper plate 4. It will be noted that the spacers 11 also serve to fasten the support disc 1 and the guide ring 2 together, with the support disc 1 lying flat against the outer surface of the guide ring 2.

The guide rings 2 and 3, together with the damper plate 4 and the springs 5, are all part of a first torsion damping device referred to as the main damper. The purpose of the main damper is to absorb vibrations while the vehicle is running. The main damper is stiffer than a second torsion damping device 7, referred to as the predamper, which acts as a preliminary damper for torsional vibrations.

The predamper 7 is mounted firstly, radially inwardly of the springs 5, and secondly, axially between the damper plate 4 and the guide ring 2, which is referred to as the first guide ring. The function of the predamper is to absorb vibrations during the slow running mode of the engine of the vehicle. It comprises an input part 70 which is coupled to the damper plate 4 for rotation with the latter, an output part 74 which is fixed to the hub 6 for rotation with the hub, and a set of second resilient members 50. These members 50 are of low stiffness, and are interposed circumferentially between the input part 70 and the output part 74 of the predamper, in order to couple the said parts 70 and 74 together elastically. The second resilient members 50 consist in this example of coil springs, the stiffness of which is less than that of the springs 5 of the main damper.

Thus, during relative rotational movement between the input element 1 and the output element 6 of the torsion damper, in a first phase of that movement the springs 50 of the predamper 7 are compressed because, since the springs 5 are stiffer, the guide rings 2 and 3 are solid with the damper plate 4 in this phase. The movement continues until the circumferential clearance is taken up in the loose coupling means 60. The springs 50 remain compressed from this point on, and the damper plate 4 becomes fixed with respect to the hub 6, so as to rotate with the latter; a relative movement therefore occurs between the damper plate 4 and the guide rings 2 and 3.

The springs 5 are thus compressed in stages, with those pairs of springs 5 which are mounted without any clearance in both the windows 12 and the windows 13 being compressed first. Then, after the circumferential clearance, between the ends of the remaining springs 5 and the edges of the corresponding windows 13 in the damper plate, has been taken up, the other two pairs of springs 5 come successively into action. The movement is then continued until the spacers 11 come into engagement against the corresponding edges of the slots 14 and 114.

Figure 2:
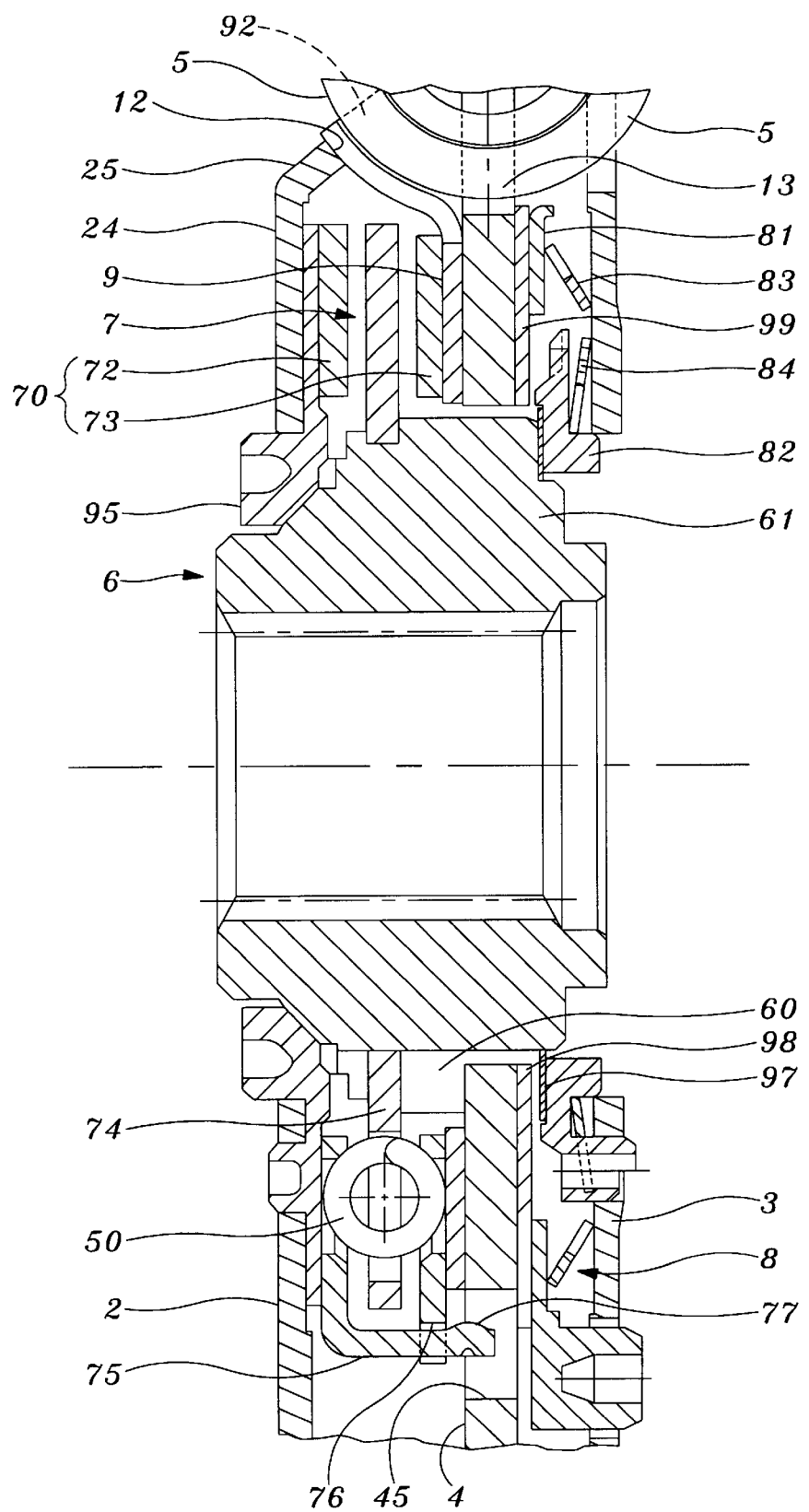
FIG. 2 is a view on a larger scale repeating the central part of FIG. 1.

Axially acting friction means 8, which work in the axial direction between the damper plate 4 and the guide rings 2 and 3, are also provided. These friction means 8 comprise, in a manner known per se, two friction rings 81 and 82 between the damper plate 4 and the other guide ring 3, on the opposite side from the predamper 7. This is best seen in FIG. 2. The guide ring 3 is referred to as the second guide ring. Each of these friction rings 81, 82 is acted on by an axially acting resilient ring 83, 84 respectively. In this example these rings 83 and 84 are of the Belleville ring type, though in a modified version they may consist of corrugated rings. The resilient rings 83 and 84 bear on the second guide ring 3 so as to urge the friction rings 81 and 82 respectively towards the damper plate 4 and the flange 61 of the hub 6. The friction ring 81 and resilient ring 83 are associated with the main damper; they surround the friction ring 82 and resilient ring 84, which are associated with the torsion predamper 7. For this reason the resilient ring 84 is made less stiff than the resilient ring 83. In this connection, the stiffness of the ring 84 is so selected that it does not nullify the action of the low stiffness springs 50.

Each of the friction rings 81 and 82 includes spigots engaged in complementary holes for coupling the friction rings 81 and 82 with the second guide ring 3. These spigots and complementary holes are not given reference numerals in the drawings.

A control ring 9 is arranged between the first guide ring 2 and the damper plate 4. This control ring 9 has at least one radially projecting abutment means 92 which is adapted to cooperate with a circumferential end of one of the first resilient members 5, of high stiffness, of the main damper. The control ring 9 is acted on by the resilient ring 83 associated with the main damper, so as to clamp the predamper 7 between the damper plate 4 and the first guide ring 2 in a manner to be described below.

The guide ring 9 is interposed axially between the input part 70 of the predamper 7 and the damper plate 4. The abutment means 92 of the control ring 9 is adapted to cooperate with at least one of the lateral edges 22 (which may also be referred to as circumferential edges) of the housing 12 of the first guide ring 2, this housing 12 being associated with the first resilient member 5 adapted to cooperate with the abutment means 92.

In FIGS. 1 to 11, the predamper 7 itself includes two guide rings 72 and 73 which are arranged on either side of a second damper plate 74. The damper plate 74 is mounted on the hub 6 (i.e. the output element) for rotation with the hub 6. The guide rings 72 and 73 will be referred to from here on as the third and fourth guide rings respectively. They constitute the input part 70 of the predamper 7, while the second damper plate 74 constitutes its output part. More precisely, the predamper 7 is in fact of the same type as that which is described in the specification of French patent 2,718,208 filed on 11 Mar. 1994. Accordingly, the third and fourth guide rings 72 and 73 are of metal, and are arranged axially on either side of the second damper plate 74, which is also of metal.

One of the guide rings 72, 73, namely the third guide ring 72 which is in fact the one spaced further away from the damper plate 4, has at its outer periphery assembly lugs 75 (see especially FIGS. 2 and 7), which project radially beyond the outer periphery of the second damper plate 74. Each of these assembly lugs 75 extends, with a mounting clearance, through a complementary notch 76 which is formed in the outer periphery of the fourth guide ring 73.

The axially oriented free end portion of each assembly lug 25 is adapted to constitute a drive finger cooperating with the damper plate 4 of the main damper. For this purpose, each lug 75 penetrates into, and is fitted in, a complementary circumferential aperture 45 which is formed in the damper plate 4, thereby coupling the predamper 7 with the damper plate 4 for rotation with the latter.

Each lug 75 is deformed radially inwardly, so as to form a retaining means adapted to cooperate with the surface of the fourth guide ring 73, which, in this example, is adjacent to the control ring 9. This deformation can be seen at 77 in FIG. 2. In this example the deformations 77 of the lugs 75 are formed initially, before the lugs 75 are introduced into the notches 76 of the fourth guide ring 73, so that means are thereby formed for snap-fitting the assembly lugs 75 into position so as to connect the two guide rings 72 and 73.

In practice, there is a radial clearance between the inner edges of the notches 76 and the assembly lugs 75 closest to the common axis of the predamper and main damper. The deformations 77 consist of local press-formed dimples formed in the centre of each lug 75.

Figure 7:
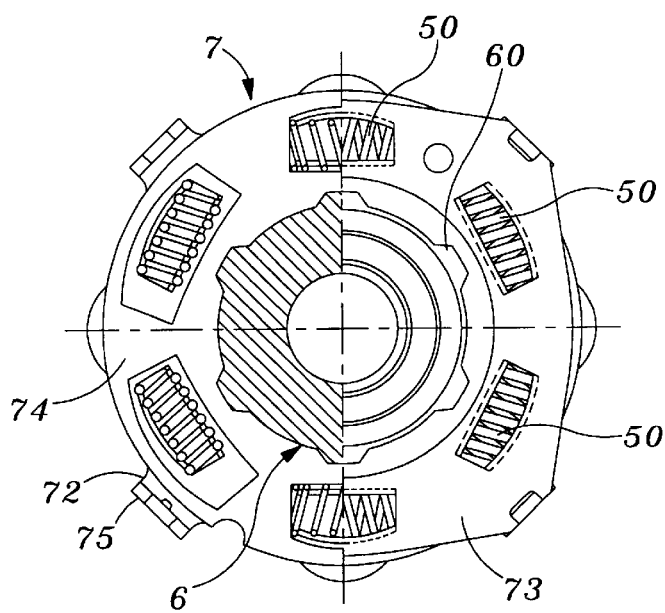
FIG. 7 is a front view of the torsion predamping device of FIG. 1, a seen in the direction of the arrow 7 in FIG. 1.
Figure 8:
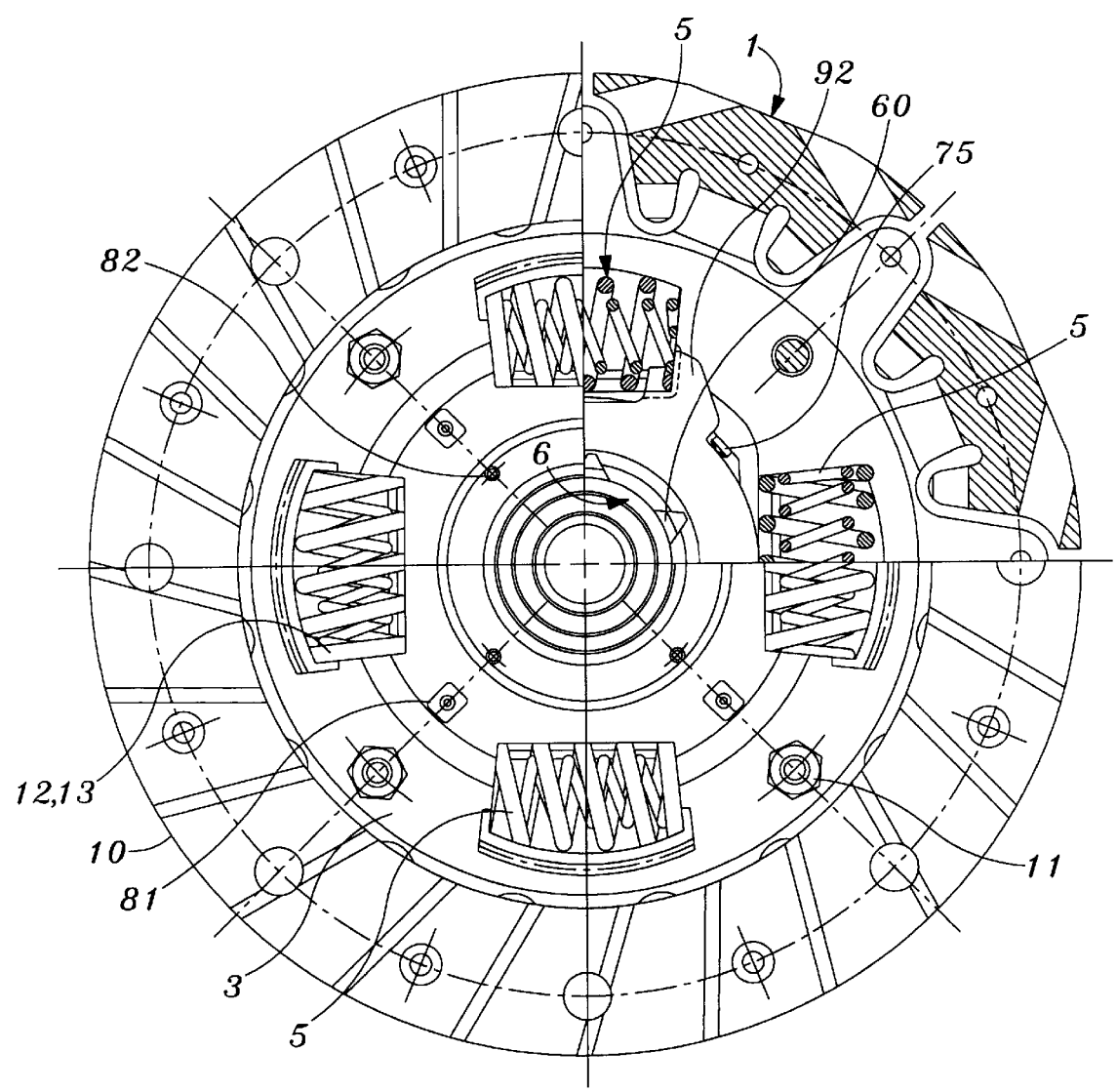
FIG. 8 is a view of the torsion damper in the direction of the arrow 7 in FIG. 1, shown partly cut away.

In this example, and as can be seen best in FIG. 7, in which the left hand part of the predamper is shown cut away in order to illustrate the damper plate 74 of the latter, the low stiffness springs 50 are mounted in housings (not given reference numerals) which are formed in the second damper plate 74 and, in facing relationship with these latter, in the third and fourth guide rings 72 and 73. These housings consist of windows as can be seen in FIG. 7. In the present example there are six springs 50, of the coil spring type, which are spaced apart at regular intervals along a common pitch circle. The springs 50 are all mounted without any clearance in the windows of the guide rings 72 and 73.

Two of the springs 50, diametrically opposed to each other, are mounted without any clearance in the windows of the damper plate 74. Two further diametrically opposed springs 50 are mounted with a circumferential clearance in windows of the damper plate 74. Finally, the remaining two springs 50, again diametrically opposed to each other, are mounted in windows of the damper plate 74, here with a larger circumferential clearance. The predamper 7 thus operates in three stages.

Figure 9:
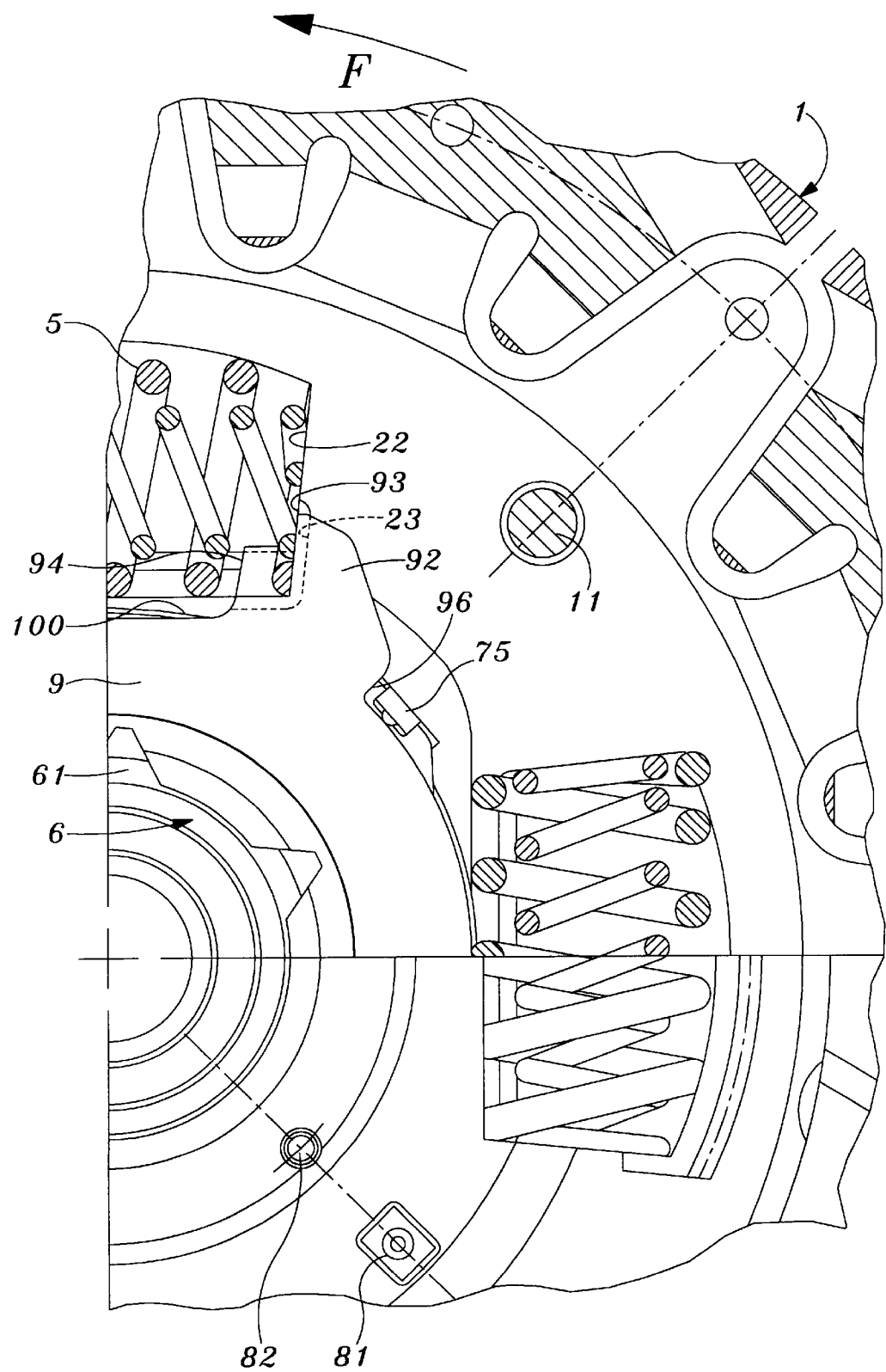
FIG. 9 is a view on an enlarged scale, showing the radial lug of the control ring of FIG. 8.

As is best seen in FIG. 9, the above mentioned abutment means 92 consists of a lug which projects radially with respect to the outer periphery of the control ring 9, so as to come into engagement with the appropriate pair of main damper springs 5. In this example, as can be seen best in FIG. 10, two lugs 92 are provided, these being generally in diametrical opposition, for engaging with two diametrically opposed pairs of the main damper springs 5. In addition, in this example the control ring 9 is of metal.

Each radial lug 92 is bounded in the circumferential direction by a generally axially orientated cradle element 93, 94, and by a transverse shoulder 96. This shoulder 96 is arranged for cooperation with the free end of one of the axial lugs 75 of the third guide ring 72 (see FIG. 9). The axially oriented cradle element 93, 94 is adapted for cooperation with the lateral edge 22 of the corresponding housing or window 12 of the first guide ring 2. To this end, the cradle element 93, 94 includes a portion 93 which defines a transverse shoulder, and which is adapted to cooperate with the radially inner portion of the lateral edge 22, which is formed with a notch 23 for this purpose in its lower corner, as can be seen clearly in FIGS. 5 and 6.

Figure 11:
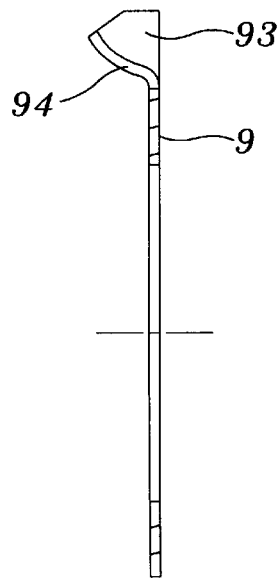
FIG. 11 is a partial view in cross section taken on the line 11—11 in FIG. 10.

Thus the portion 93, which is most clearly seen in FIG. 11, is lodged within the notch 23 into which it penetrates, the portion 93 being interposed circumferentially between the base of the notch 23 and the circumferential ends of the corresponding pair of springs 5. The portion 93 is joined at its inner periphery to an axially oriented curved portion 94, which matches the internal profile of the endmost turn of the adjacent one of the associated pair of springs 5 that has the larger diameter, see FIG. 2. For this reason the portion 93 has an inclined terminal edge, by which it is joined to the free end of the curved portion 94, as can be seen in FIG. 11.

The circumferential end of this pair of springs 5 is thus in intimate contact with the curved portion 94, and is in endwise abutment on the axial portion 93. The curved portion 94 supports on its radially inward side the larger spring 5 of the pair.

Figure 10:
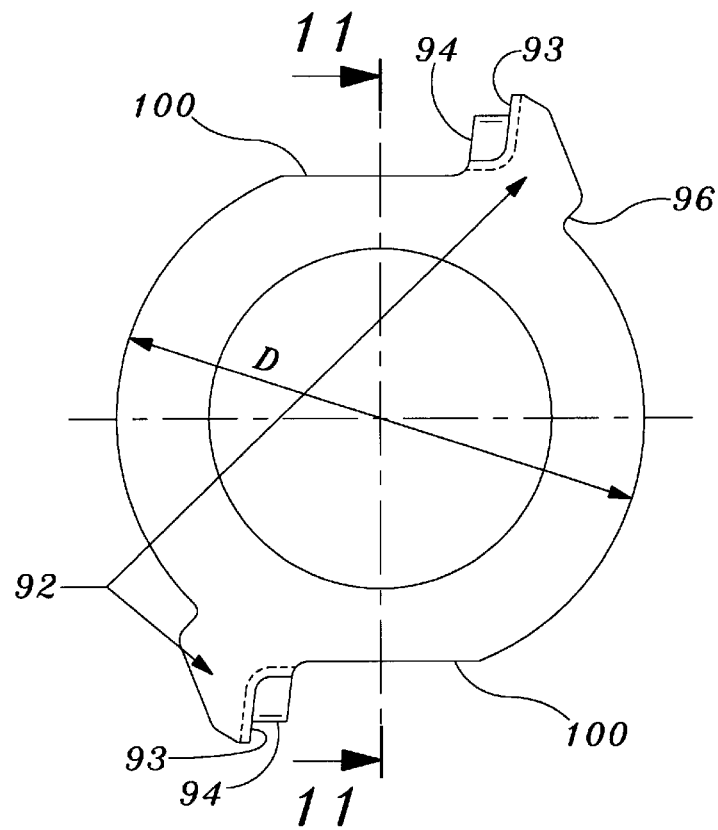
FIG. 10 is a front view of the control ring in accordance with the invention.

It will be noted from FIG. 10 that the control ring 9, having a diameter D, is formed with flats 100 which are disposed radially inwardly of the pairs of springs associated with the lugs 92. The axial cradle element 93, 94 of each abutment lug 92 of the control ring lies radially outwardly of the predamper 7, and extends axially from the main damper plate 4 to the first guide ring 2 (see FIG. 2). Thus the axial cradle element 93, 94 projects axially with respect to the plane of the control ring 9, towards the first guide ring 2, so as to come into engagement with the latter.

Referring now once again in particular to FIGS. 1 and 2, a bearing 95, having a frusto-conical bearing surface, is interposed radially between the inner periphery of the first guide ring 2 and a complementary frusto-conical surface formed on the hub 6 at its outer periphery. The bearing 95 includes a transversely oriented portion which is interposed axially between the third guide ring 72 and the first guide ring 2. This transverse portion of the bearing 95 includes a plurality of driving spigots, each of which is engaged in a complementary hole formed in the first guide ring 2, so as to couple the bearing 95 with the first guide ring 2 for rotation together. The driving spigots and the corresponding holes in the guide ring 2 are not given reference numerals in the drawings.

At its inner periphery, the guide ring 2 has a generally transversely oriented wall portion 24 for contact with the transverse portion of the bearing 95. This wall portion 24 is joined in a junction zone 25 to the main part of the guide ring 2. The junction zone 25 is oriented axially between the windows 12, by virtue of slots 26 (see FIG. 5) which are formed radially inwardly of the holes through which the spacers 11 extend. In the region of the windows 12, the junction zone 25 is inclined, and it defines the lower longitudinal edge of each window 12.

Thus, each of the notches 23, formed in two of the windows 12, is bounded by an inclined portion. The end of the curved portion 94 of the cradle element of each abutment lug 92 is inclined so as to match the profile of the inclined portion of the junction zone 25, and so as to come into engagement with the radially-inner longitudinal edge of the associated window 12. In this way, contact is obtained over a substantial length between the abutment means 92 and the corresponding window 12 of the first guide ring 2.

It will be noted that the wall portion 24 is offset axially with respect to the main portion of the guide ring 2, so as to enable the predamper 7 to be accommodated.

A further friction ring 99 is fitted in contact with the main damper plate 4, on the side of the latter opposed to the predamper. This friction ring 99 is interposed axially between the friction ring 81 and the damper plate 4, and is acted on by the resilient ring 83.

It will also be noted that a protective ring 97 is fitted, being interposed axially between the friction ring 82 and the outer periphery of the flange 61 of the hub 6. It is in this location at the tooth set of the hub 6 is formed. Thus the protective ring 97 prevents any abrasion of the friction ring 82. The ring 82 is preferably made of a suitable synthetic material, for example a plastics material which is preferably reinforced by fibres, such as glass fibre. The friction ring 81 and/or the bearing 95 may be made of a similar material.

The friction ring 99 has at its inner periphery a set of teeth 98 which mesh, with a circumferential clearance, with the tooth set of the hub 6. This clearance is smaller than that which is provided between the tooth set of the main damper plate 4 and the tooth set of the hub 6. Thus, the friction ring 99 is caused, under the action of the resilient ring 83, to act in the manner of a draw member, so as to apply a braking force to the relative movement between the damper plate 4 and the hub 6, thus reducing noise that may be caused by impact between the teeth of the hub 6 and those of the damper plate 4 when these teeth come into engagement with each other.

It will have been understood that the resilient ring 84 causes the bearing 95 to be clamped axially in contact with the hub 6. Thus, during the relative movement between the main damper plate 4 and the hub 6, friction is set up between the hub 6 and the bearing 95, with the friction ring 82 rubbing frictionally against the protective ring 97.

When the main damper plate 4 is solid in rotation with the hub 6 by elimination of the clearance in the loose coupling means 60, friction is set up between the transverse portion of the bearing 95 and the third guide ring 72. A further friction effect is set up between the control ring 9 and the main damper plate 4.

In this connection, during the relative movement between the guide rings 2, 3, and the main damper plate 4, the curved portion 94 and the axial portion 93 of each abutment lug 92 is in engagement, respectively, with the base of the notch 23 in the edge 22 of the corresponding window 12 and the circumferential end of the associated pair of springs 50, so that relative movement takes place between the control ring 9, driven by the guide ring 2, and the main damper plate 4. In addition, relative movement also takes place between the control ring 9 and the fourth guide ring 73. The main damper springs 5 act as return springs for the control ring 9.

In the opposite direction (referred to as the "retro" sense) the shoulder 96 of each of the abutment lugs 92 cooperates with the free end of the corresponding assembly lug 75 of the predamper 7, so that no relative movement takes place between the main damper plate 4 and the control ring 9, nor between the control ring 9 and the fourth guide ring 73 of the torsion predamper 7.

Differential friction is thus obtained, which is favourable to good absorption of vibrations, the faces of the control ring 9 being either active or inactive according to the rotation of the first guide ring 2 with respect to the main damper plate 4. Thus, when the engine is driving the road wheels of the vehicle in forward motion, rotation of the torsion damper being in the direction indicated by the arrow F in FIG. 9, the two faces of the control ring 9 are active. However, in this retro sense, in which the engine is being driven by the road wheels, the control ring 9 is inactive.

In a modified version, a clearance may be provided between the shoulders 96 and the assembly lugs 75, so that the control ring 9 is then immobile when operating in the retro sense, under the action of the spring 83.

The second damper plate 74 is of course secured to the hub 6 by seaming in the manner known per se. More exactly, the tooth set of the hub 6 has two axially stepped portions, which are such that the damper plate 74 is in axial contact with the shoulder defined by the stepped configuration of the tooth set of the hub 6. In the other axial direction, the damper plate 74 is located axially by upsetting of the material of the metal hub 6. The damper plate 74 includes, as is shown in FIG. 7 and in a manner known per se, a set of teeth at its inner periphery, which mesh without any clearance with the tooth set, of reduced height, of the hub 6.

The present invention is of course not limited to the embodiment described up to this point. In particular, the third guide ring 72 may include axially oriented engagement lugs, which are provided for the sole purpose of cooperating with the shoulders 96 of the abutment lugs 92 of the control ring, with these axial engagement lugs being disposed alternately with axial lugs which serve for the assembly of the two guide rings 72 and 73 together, and for driving the torsion predamper 7 in rotation. This is possible because, for example in FIG. 7, four lugs are provided such that two lugs can be arranged for driving the torsion predamper in rotation, with two engagement (or abutment) lugs for cooperating with the shoulders 96 of the control ring 9, with the abutment lug not penetrating into the main damper plate 4.

In another modified version, the guide ring 73 adjacent to the control ring 9 may have axial projections, which can for example be formed by press-forming at its outer periphery in order to cooperate with the shoulders 96 of the control ring 9.

Thus, in both of these cases, the damper plate has a minimum number of holes for coupling it in rotation with the predamper 7.

Figure 12:
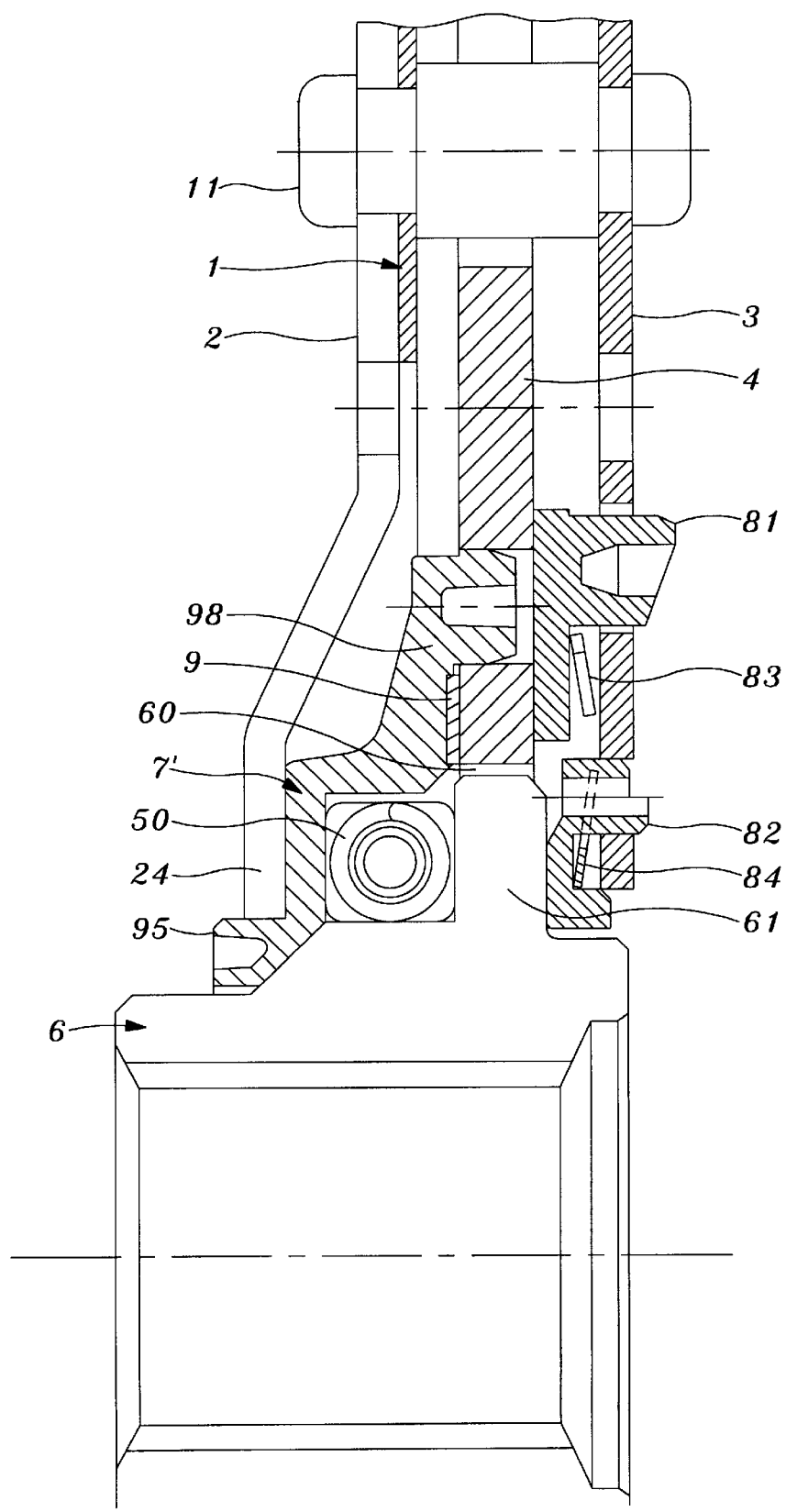
FIG. 12 is a partial view similar to FIG. 1, but shows a modified embodiment of the invention.

Referring to FIG. 12, the torsion predamper may of course have an input part which also constitutes the bearing 95 of FIGS. 1 to 11. This input part then includes an axially oriented crown, which defines the bearing and which is interposed radially between the inner periphery of the guide ring 2 and the frusto-conical surface of the hub 6.

This crown is extended by a transversely oriented first wall portion 98 in contact with the wall portion 24 of the guide ring 2. The wall portion 98 is extended by an axially oriented wall portion which is itself joined to a second, transversely oriented, wall portion formed with axial projections. These projections consist of spigots which are fitted axially into complementary apertures formed in the main damper plate 4, so as to couple the damper plate 4 in rotation to the input part of the predamper 7'. The control ring 9 is then interposed between the transversely oriented second wall portion 98 and the main damper plate 4.

The output part of this predamper in FIG. 12 consists of the hub 6 itself. The hub is recessed, as is the axially oriented portion of the output part of the predamper, so as to accommodate the low stiffness springs 50 in the manner described in French patent specification No. FR 94 13514. More precisely, slots, formed in the axial portion of the bearing 95, have inclined side edges and are open inwardly, while the hub 6 has at its outer periphery, facing the slots in the bearing 95, further slots with inclined side edges, which are open outwardly.

The springs 50 engage on the side edges of the slots of the bearing 95 and of the hub, these slots being of swallowtail form, by means of cup elements having a dihedral-shaped back face for engaging on the side edges of the slots. These cup elements have spigots which penetrate into the springs 50 in order to retain the latter. The bearing 95 is of a synthetic material so that friction forces are obtained the value of which varies according to which one of the faces of the control ring 9 is under friction.

The control ring of FIGS. 1 to 11 may of course be of a plastics material, preferably reinforced by fibres.

The fourth guide ring 73 may be of a suitable plastics material, such that differential friction effects are obtained where the control ring is of metal. Similarly, the surface of the damper plate which is in contact with the control ring may be coated with a layer having an appropriate coefficient of friction. All of this depends on the desired application of the torsion damper.

Similarly, the support disc 1 may be fixed directly to the reaction plate, so as itself to constitute the input element of the damper. In a modified version, this input element may consist of the first or second guide ring, which is then extended suitably and fixed on the reaction plate.

What is claimed is:

1. A torsion damper comprising:
an input element fixed to two guide rinds which are mounted on either side of a damper plate, and which are connected and fastened to each other by means of spacers; first housings formed in facing relationship with each other in the guide rings and the damper plate respectively; first circumferentially acting resilient members mounted in the housings so as to couple the guide rings resiliently to the damper plate; an output element surrounded by the guide rings and the damper plate; loose coupling means interposed operatively between the inner periphery of the damper plate and the outer periphery of the output element, for coupling the damper plate with the output element for rotation together after a circumferential clearance, defined by the loose coupling means, has been taken up; a predamper, which is mounted, firstly, radially inwardly of the first resilient members, and secondly, axially between the damper plate and one of the guide rings, referred to as the first guide ring; and axially acting friction means comprising at least one friction ring and an axially acting resilient ring bearing on the other guide ring, referred to as the second guide ring, so as to act on the friction ring and clamp the predamper between the damper plate and the first guide ring, wherein the predamper comprises an input part coupled in rotation to the damper plate, an output part coupled in rotation to the output element, and circumferentially acting second resilient members interposed between the input part and the output part, and wherein a control ring, having an abutment means projecting radially so as to come into engagement with one of the circumferential ends of one of the first resilient members, is acted on by the friction means, being arranged between the damper plate and the first guide ring, wherein the control ring is interposed axially between the input part of the predamper and the damper plate, and the abutment means of the control ring is adapted to cooperate with at least one of the lateral edges of the first housing in the first guide ring associated with the first resilient members.

2. A damper according to claim 1, wherein the input part of the predamper includes axially projecting elements, the abutment means cooperating, firstly, with a circumferential end of an associated said first resilient member and the lateral edge of the housing in the first guide ring, and secondly, with the said axially projecting elements of the input part.

3. A damper according to claim 2, wherein the axially projecting elements of the input part of the predamper constitute driving projections for cooperating with the damper plate.

4. A damper according to claim 2, in which the output part of the predamper includes a second damper plate and a third guide ring and a fourth guide ring which are arranged on either side of the second damper plate, wherein one of the third and fourth guide rings is disposed further away axially from the first damper plate than the other one of the fourth and third guide rings and has driving projections for cooperating with the first damper plate and comprising axial lugs, the first damper plate having apertures complementary with the axial lugs, the axial lugs penetrating into the complementary apertures so as to couple the predamper with the first damper plate for rotation therewith.

5. A damper according to claim 2, wherein the said control ring has at least one lug projecting radially and constituting the abutment means, for engagement with the said first resilient member.

6. A damper according to claim 5, wherein the control ring has two radial lugs generally diametrically opposed to each other for engagement with two diametrically opposed said first resilient members.

7. A damper according to claim 5, wherein each said radial lug defines, and is bounded circumferentially by, a generally axially oriented portion and a transverse shoulder.

8. A damper according to claim 7, wherein the control ring defines a plane thereof, the axially oriented portion of the radial lug lying radially outwardly of the predamper and extending axially from the first damper plate to the first guide ring, and projecting axially with respect to the plane of the control ring towards the first guide ring, for engagement with the first guide ring.

9. A damper according to claim 8, further including a bearing interposed axially between the predamper and the first guide ring, the bearing having a transverse portion, and the first guide ring having at an inner periphery a generally transversely oriented wall portion for contact of the said wall portion with the said transverse portion of the bearing.

10. A damper according to claim 9, wherein the first guide ring further includes an inclined junction zone in the region of said first housings, the said transverse wall portion being joined to the said junction zone.

11. A damper according to claim 9, wherein the axially oriented portion of the radial lug defines an inclined terminal edge matching the profile of the said junction zone.

12. A damper according to claim 7, wherein the axially oriented portion of each said radial lug is adapted to cooperate with the lateral edge of the first housing in the first guide ring.

13. A damper according to claim 12, wherein the axially oriented portion of said radial lug comprises an axial element defining a transverse shoulder, the lateral edge of the associated housing having a radially inner corner and defining a notch in the inner corner, the transverse shoulder cooperating with the notch.

14. A damper according to claim 13, wherein said notch has a base surface, the axial element defining the transverse shoulder being lodged in the notch and interposed circumferentially between the base surface of the notch and the adjacent circumferential end of a first resilient member.

15. A damper according to claim 13, wherein the axially oriented portion of said radial lug further comprises an axially oriented curved portion, each said first resilient member being a helical spring having a plurality of turns, the curved portion having a profile matching that of the endmost turn of the first spring, the axial element of the axially oriented portion being joined on a radially inner side to the curved portion.

16. A damper according to claim 1, wherein the loose coupling means comprises a set of teeth on the output element, the damper including a further friction ring interposed axially between the first damper plate and said friction ring of the said friction means, the said further friction ring having a set of teeth at the inner periphery meshing with the said set of teeth of the output element and defining a circumferential clearance between the two said sets of teeth.

* * * * *